United States Patent
Kwon

(10) Patent No.: US 8,503,473 B2
(45) Date of Patent: Aug. 6, 2013

(54) WIRELESS NETWORK SYSTEM AND METHOD OF TRANSMITTING AND RECEIVING DATA OVER THE WIRELESS NETWORK SYSTEM

(75) Inventor: Chang-yeul Kwon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1602 days.

(21) Appl. No.: 12/014,992

(22) Filed: Jan. 16, 2008

(65) Prior Publication Data

US 2008/0192723 A1    Aug. 14, 2008

Related U.S. Application Data

(60) Provisional application No. 60/900,345, filed on Feb. 9, 2007.

(30) Foreign Application Priority Data

Jun. 20, 2007   (KR) .......................... 10-2007-0060590

(51) Int. Cl.
    *H04B 7/00*       (2006.01)
(52) U.S. Cl.
    USPC ......................................... 370/445; 370/447
(58) Field of Classification Search
    USPC ................................................ 370/445, 447
    See application file for complete search history.

(56) References Cited

U.S. PATENT DOCUMENTS

| 7,280,518 | B2 | 10/2007 | Montano et al. | |
| 7,460,555 | B2 | 12/2008 | Yamaguchi et al. | |
| 7,561,525 | B2 | 7/2009 | Saito | |
| 2003/0152059 | A1 | 8/2003 | Odman | |
| 2005/0013267 | A1 | 1/2005 | An | |
| 2005/0030931 | A1* | 2/2005 | Sung et al. | 370/342 |
| 2005/0058084 | A1* | 3/2005 | Hester et al. | 370/254 |
| 2005/0089045 | A1 | 4/2005 | Shim et al. | |
| 2005/0089058 | A1* | 4/2005 | Hong et al. | 370/445 |
| 2005/0193116 | A1 | 9/2005 | Ayyagari et al. | |
| 2005/0265371 | A1* | 12/2005 | Sharma et al. | 370/428 |

(Continued)

FOREIGN PATENT DOCUMENTS

| CN | 1578242 A | 2/2005 |
| CN | 1744553 A | 3/2006 |

(Continued)

OTHER PUBLICATIONS 802.15.3 IEEE standard, Part 15.3, IEEE, Sep. 2003, pp. 1-324.

(Continued)

*Primary Examiner* — Jay P Patel
(74) *Attorney, Agent, or Firm* — Sughrue Mion, PLLC

(57) ABSTRACT

A wireless network system is provided in which time periods during which packets are transmitted or received for bandwidth allocation request and acknowledgement over a network are separately set in a superframe period, and data is transmitted or received through the bandwidths allocation. The wireless network system includes a frame-generation unit which generates a beacon frame for constructing a superframe including one or more channel time blocks, a bandwidth-management unit which sets among the one or more channel time blocks first channel time blocks as a bandwidth allocated period for a particular station on a network and second channel time blocks as packet transmission or reception periods for a bandwidth-use-request packet on the network, and a communication unit which transmits the beacon frame including reservation information for setting the first and second channel time blocks through a communication channel.

44 Claims, 10 Drawing Sheets

(56) References Cited

U.S. PATENT DOCUMENTS

| | | | |
|---|---|---|---|
| 2006/0203795 A1* | 9/2006 | Welborn et al. | 370/345 |
| 2007/0165589 A1 | 7/2007 | Sakoda | |
| 2007/0248072 A1 | 10/2007 | Kwon et al. | |
| 2008/0101253 A1* | 5/2008 | Shvodian | 370/252 |
| 2009/0067389 A1 | 3/2009 | Lee et al. | |
| 2009/0268701 A1* | 10/2009 | Welborn et al. | 370/336 |

FOREIGN PATENT DOCUMENTS

| | | |
|---|---|---|
| CN | 1791051 A | 6/2006 |
| KR | 10-2005-0028737 A | 3/2005 |
| KR | 10-2005-0102702 A | 10/2005 |
| KR | 10-2006-0003560 A | 1/2006 |
| KR | 10-2006-0059003 A | 6/2006 |
| KR | 10-0791300 B1 | 1/2008 |

OTHER PUBLICATIONS

First Office Action dated May 12, 2010, issued by the State Intellectual Property Office of P.R. China in counterpart Chinese Application No. 200810005710.8.

* cited by examiner

WIRELESS NETWORK SYSTEM AND METHOD OF TRANSMITTING AND RECEIVING DATA OVER THE WIRELESS NETWORK SYSTEM

CROSS-REFERENCE TO RELATED APPLICATION

This application claims priority from U.S. Provisional Application No. 60/900,345 filed on Feb. 9, 2007, and Korean Patent Application No. 10-2007-0060590 filed on Jun. 20, 2007 in the Korean Intellectual Property Office, the disclosure of which is incorporated herein by reference in its entirety.

BACKGROUND OF THE INVENTION

1. Field of the Invention

The present invention relates to a wireless network system and a method for transmitting and receiving data over the wireless network system, and, more particularly, to a wireless network system, in which time periods for a bandwidth allocation request and a bandwidth-allocation-acknowledge packet are separately set within a superframe and data is transmitted or received in allocated bandwidths, and a method of transmitting and receiving data over the wireless network system.

2. Description of the Related Art

FIG. 1 is a view illustrating the structure of a related art superframe. As illustrated in FIG. 1, the related art superframe 100 is composed of a beacon period 110 appearing in the starting portion thereof, a Contention Access Period (CAP) 120, and Channel Time Allocation Period (CTAP) 130. During the CAP 120, asynchronous data, control commands, or the like can be transmitted or received. The CTAP 130 consists of a plurality of blocks of Management Channel Time Allocation (MCTA) 131 and a plurality of blocks of Channel Time Allocation (CTA) 132. Control commands, isochronous data, asynchronous, or the like can be transmitted or received through the CTA 132.

The length of the CAP 120 is determined by an Access Point (AP), and transmitted to stations participating in a network through a beacon frame distributed in the beacon period 110.

Carrier Sense Multiple Access with Collision Avoidance (CSMA/CA) is used in the CAP 120 for media access. In contrast, Time Division Multiple Access (TDMA) during which each wireless network station has a specific time window is used in the CTAP 130. An AP allocates a channel time to a device requesting media access, and performs transmission or reception of data with a corresponding wireless network station during the allocated channel time. Here, the MCTA 131 is assigned to a pair of wireless network stations attempting to exchange data, so that it performs media access through a TDMA media access, or is used as a shared CTA using the slotted Aloha protocol.

There are two data transmission schemes: a compressed data transmission mode; and an uncompressed data transmission scheme. In the first transmission mode, compressed data is transmitted through a bandwidth of several gigabytes. In the latter transmission mode, uncompressed data is transmitted through a bandwidth of several tens of gigabytes. The uncompressed data, which is larger than the compressed data, can be transmitted through a bandwidth of several tens of gigabytes. Uncompressed data is less vulnerable to packet loss occurring during data transmission than in the case of compressed data. In order for a transmitting station to transmit data, the transmitting station should send a request for bandwidth allocation and then receive an acknowledgement response. This procedure is made in the CAP 120. That is, the transmitting station should contend with other stations existing on the network for media access. Here, when the transmitting station cannot receive the acknowledgement for the bandwidth allocation in the media access contention, the transmitting station has to wait for a next contention period or a next superframe.

For these reasons, a receiving-station user who attempts to receive multimedia content from the transmitting station for real-time reproduction may encounter inconvenience due to a delay in data reception. Accordingly, a method of effectively transmitting and receiving data through an improved contention mechanism is needed.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a wireless network system in which time periods during which request and grant packets for bandwidth allocation over the wireless network system are transmitted or received are separately set in a superframe period, and data is transmitted or received using allocated bandwidths, and a method for transmitting and receiving data over the wireless network system.

According to an aspect of the present invention, there is provided a wireless network system including a frame-generation unit generating a beacon frame for constructing a superframe including one or more channel time blocks, a bandwidth-management unit setting first channel time blocks among the one or more channel time blocks as a bandwidth-allocated period for a particular station on a network and second channel time blocks as packet transmission or reception periods for a bandwidth-use-request packet on the network, and a communication unit transmitting the beacon frame including reservation information for setting the first and second channel time blocks through a predetermined communication channel.

According to another aspect of the present invention, there is provided a station including a determination unit determining whether bandwidth allocation has been made on a network based on a beacon frame received in a superframe and determining whether it is possible to transmit or receive a bandwidth-use-request packet according to the determination result, a frame-generation unit generating a data request packet for data to be transmitted if it is determined that the bandwidth allocation has been made on the network, and generating a bandwidth-use-request packet if it is determined that bandwidth-use-request packet can be transmitted or received, and a communication unit transmitting the data request packet for data to be transmitted or the bandwidth-use-request packet through a predetermined communication channel.

According to still another aspect of the present invention, there is provided a method for constructing a wireless network, the method including generating a beacon frame for constructing a superframe including one or more channel time blocks, setting first channel time blocks among the one or more channel time blocks as bandwidth allocated periods for a particular station on a network and second channel time blocks as packet transmission or reception periods for bandwidth use on the network, and transmitting the beacon frame including reservation information for setting the first and second channel time blocks through a predetermined communication channel.

According to a further aspect of the present invention, there is provided a method for transmitting and receiving data, the method including determining whether bandwidth allocation has been made on a network based on a beacon frame received in a superframe and determining whether it is possible to transmit or receive a bandwidth-use-request packet according to the determination result, generating a data request data request packet for data to be transmitted if it is determined that bandwidth allocation has been made on the network and generating a bandwidth-use-request packet if it is determined that the bandwidth-use-request packet can be transmitted or received, and transmitting the data request packet for data to be transmitted or the bandwidth-use-request packet through a predetermined communication channel.

BRIEF DESCRIPTION OF THE DRAWINGS

The above and other aspects of the present invention will become apparent by describing in detail exemplary embodiments thereof with reference to the attached drawings in which.

DETAILED DESCRIPTION OF EXEMPLARY EMBODIMENTS OF THE INVENTION

Figure 1:
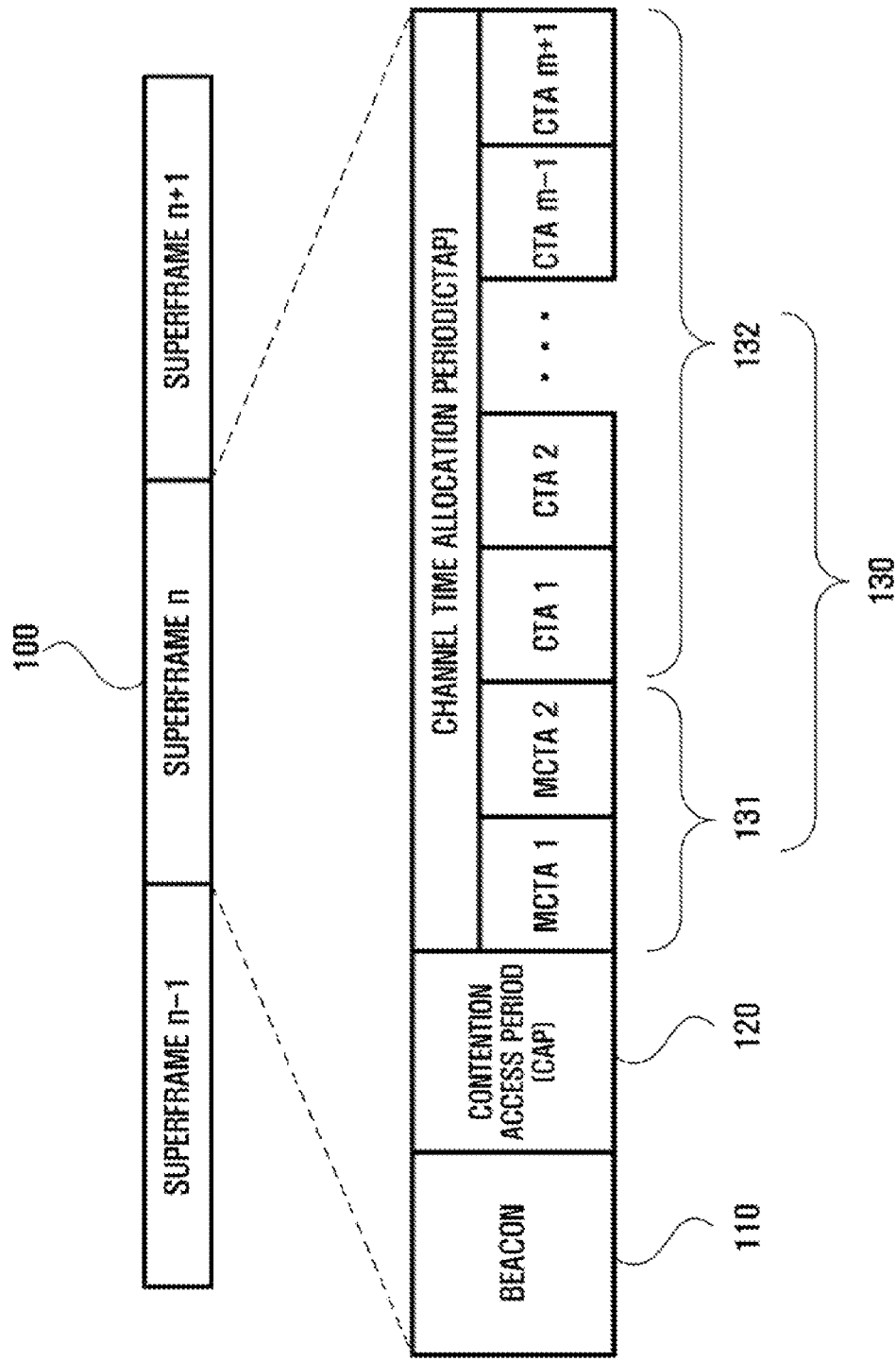
FIG. 1 is a view illustrating the structure of a related art superframe.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Hereinafter, an exemplary embodiment of the present invention will be described in detail with reference to the accompanying drawings.

Figure 2:
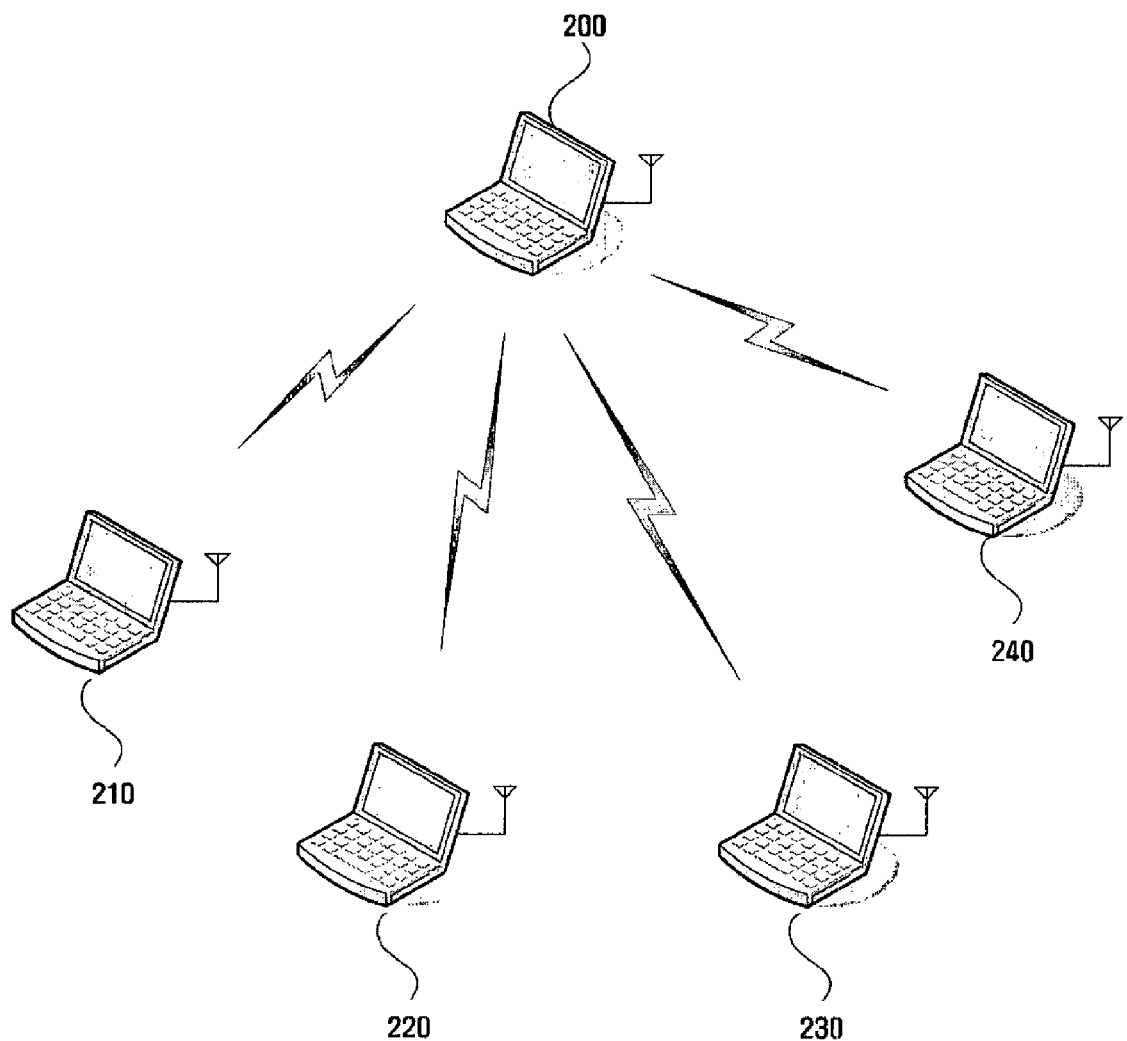
FIG. 2 is a schematic diagram of a wireless network system according to an exemplary embodiment of the present invention.

FIG. 2 is a schematic diagram of a wireless network system according to an exemplary embodiment of the present invention. Referring to FIG. 2, the wireless network system includes a wireless network coordinator 200 and wireless network stations 210, 220, 230 and 240.

The wireless network coordinator 200 is a station having network management rights, and transmits a beacon frame for coordinating bandwidth allocation for one or more wireless network stations 210, 220, 230, and 240. That is, based on the beacon frame transmitted from the wireless network coordinator 200, the one or more of the wireless network stations 210, 220, 230, and 240 constituting the network determines whether to wait for bandwidth allocation if bandwidth allocation is not made, or to transmit data to other station(s) through an allocated bandwidth if bandwidth allocation is made.

The network according to an exemplary embodiment of the present invention is based on a superframe including at least one channel time block. The at least one channel time block is divided into a reserved channel time block in which a particular station on the network is allowed for bandwidth allocation and an unreserved channel time block in which one selected among stations on the network through contention is allowed for bandwidth allocation. Here, the at least one time block is a given time period during which data is transmitted between stations existing on the network. The reserved channel time block and the unreserved channel time block correspond to a CTAP and a CAP, respectively.

A station including data to be transmitted may transmit the data through contention with other stations in the unreserved channel time block, or may transmit the data in the reserved channel time block assigned to the station.

Here, a communication channel for transmitting or receiving the beacon frame, or a communication channel for the unreserved channel time block uses a frequency of 2.4 GHz or 5 GHz. A communication channel for the reserved channel time block uses a frequency of 60 GHz.

The wireless network stations 210, 220, 230, and 240 may transmit or receive data through contention in the unreserved channel time block or may transmit a packet requesting bandwidth allocation in the reserved channel time block (hereinafter referred to as a "bandwidth-allocation-request packet"). A station newly participating in the network may transmit a packet requesting participation in the network (hereinafter referred to as a "participation-request packet"). The wireless network coordinator 200 having received the request packet, such as the bandwidth-allocation-request packet or the participation-request packet, performs scheduling for the at least one time block of the superframe, and transmits a beacon frame including scheduling information.

That is, the beacon frame contains reservation information about at least one reserved channel time block and reservation information about at least one unreserved channel time block. The wireless network stations 210, 220, 230, and 240 determines positions of the reserved channel time block and the unreserved channel time block contained in the superframe based on the reservation information included in the received beacon frame, and may then transmit or receive data in the corresponding channel time block or transmit or receive the request packet.

Figure 3:
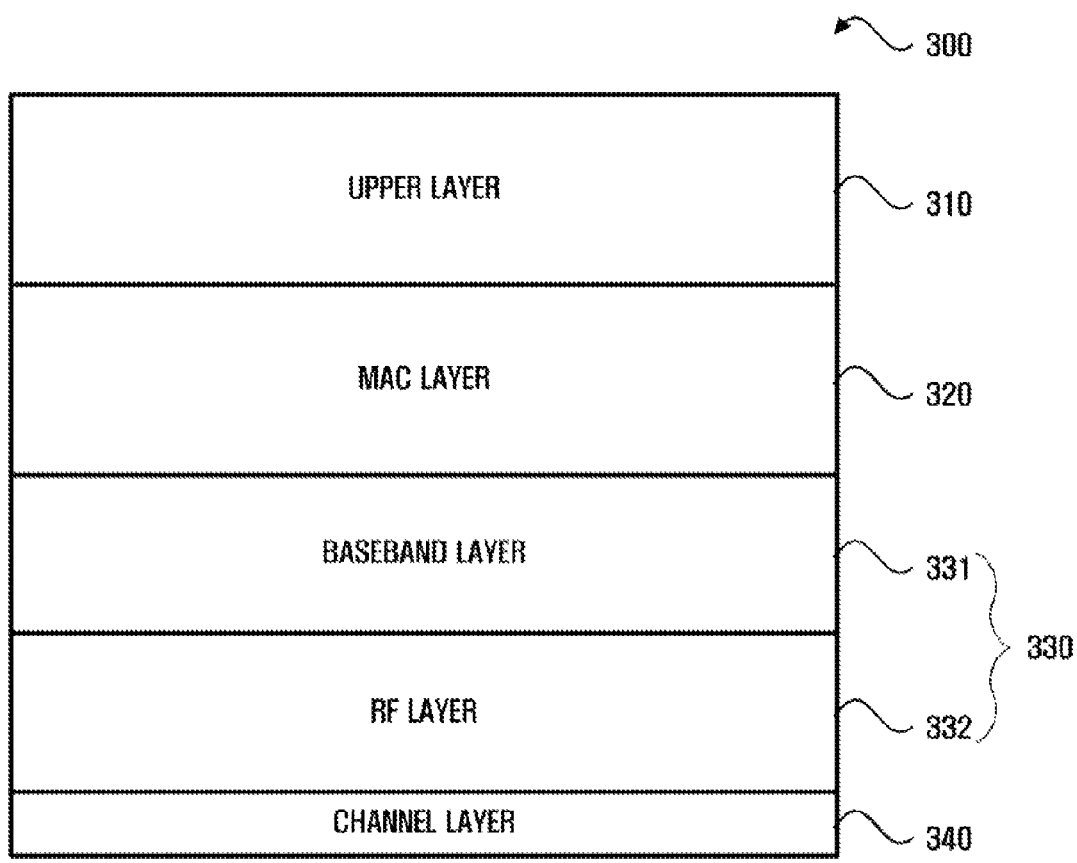
FIG. 3 illustrates a communication layer format according to an exemplary embodiment of the present invention.

FIG. 3 illustrates a communication layer format according to an exemplary embodiment of the present invention. In general, a communication layer 300 includes a channel layer 340 as a physical medium of a predetermined frequency width through which RF signals are transmitted as the lowermost layer, a Physical (PHY) layer 330 consisting of a Radio Frequency (RF) layer 332 and a baseband layer 331, a Media Access Control (MAC) layer 320, and an upper layer 310. The upper layer 31 includes layers disposed over the MAC layer 320, consisting of a Logical Link Control (LLC) layer, a network layer, a transmission layer, and an application layer.

In the RF channel according to an exemplary embodiment of the present invention, not only low-frequency, such as 2.4 GHz or 5 GHz, but also a high-frequency, such as 60 GHz. Accordingly, the channel layer 340 can perform not only omni-directional. communications but also unidirectional communications.

Figure 4:
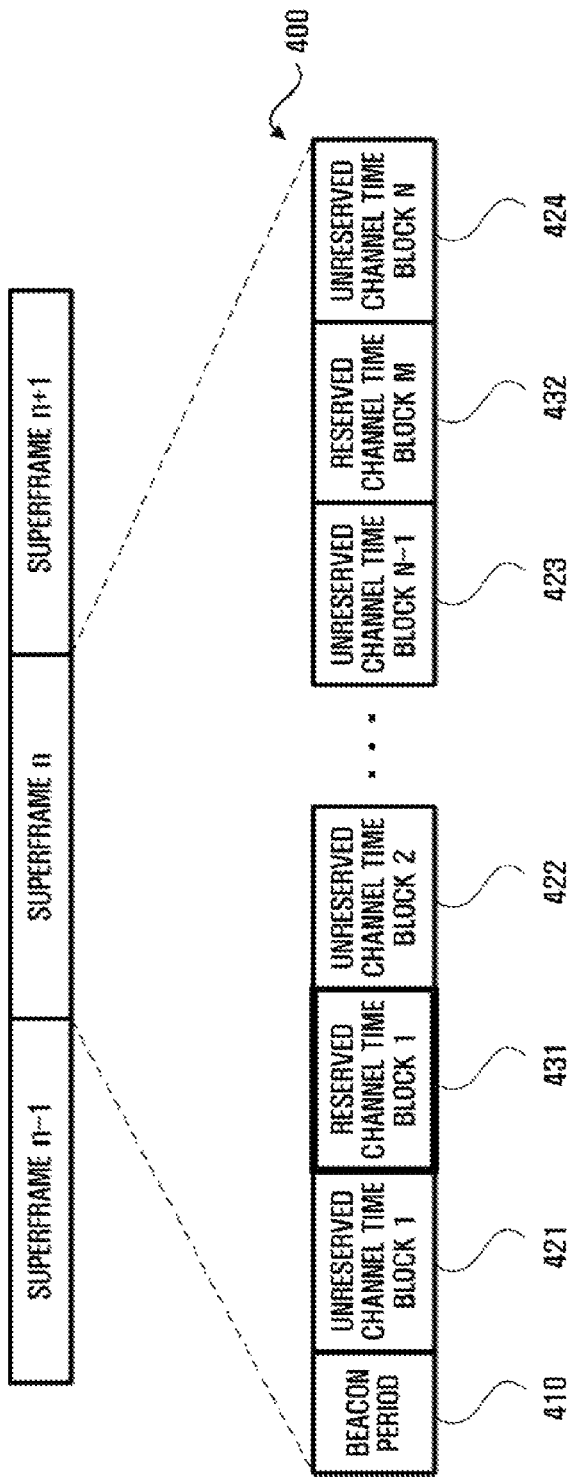
FIG. 4 illustrates a superframe structure according to an exemplary embodiment of the present invention.

FIG. 4 illustrates the structure of a superframe according to an exemplary embodiment of the present invention. Referring to FIG. 4, the superframe 400 includes a beacon period 410, unreserved channel time blocks 421, 422, 423, and 424, and reserved channel time blocks 431 and 432.

During the beacon period 410, a beacon frame is distributed by the wireless network coordinator 200, so that the stations 210, 220, 230, and 240 having received the beacon frame transmit or receive data based on reservation information contained in the beacon frame, or transmit a bandwidth-allocation-request packet through contention with other stations.

In the unreserved channel time blocks 421, 422, 423, and 424, two or more stations attempting to transmit data contend with each other. Only the station selected in the contention can transmit data through an allocated bandwidth.

In the reserved channel time blocks 431 and 432, a bandwidth is allocated to a particular station, so that the particular station can transmit data through the allocated bandwidth.

In order to notify the stations 210, 220, 230 and 240 on the network of reservation information about the reserved channel time blocks and unreserved channel time block, the beacon frame may contain information elements, including a first information element containing reservation information about reserved channel time blocks, and a second information element containing reservation information about unreserved channel time blocks.

Figure 5:
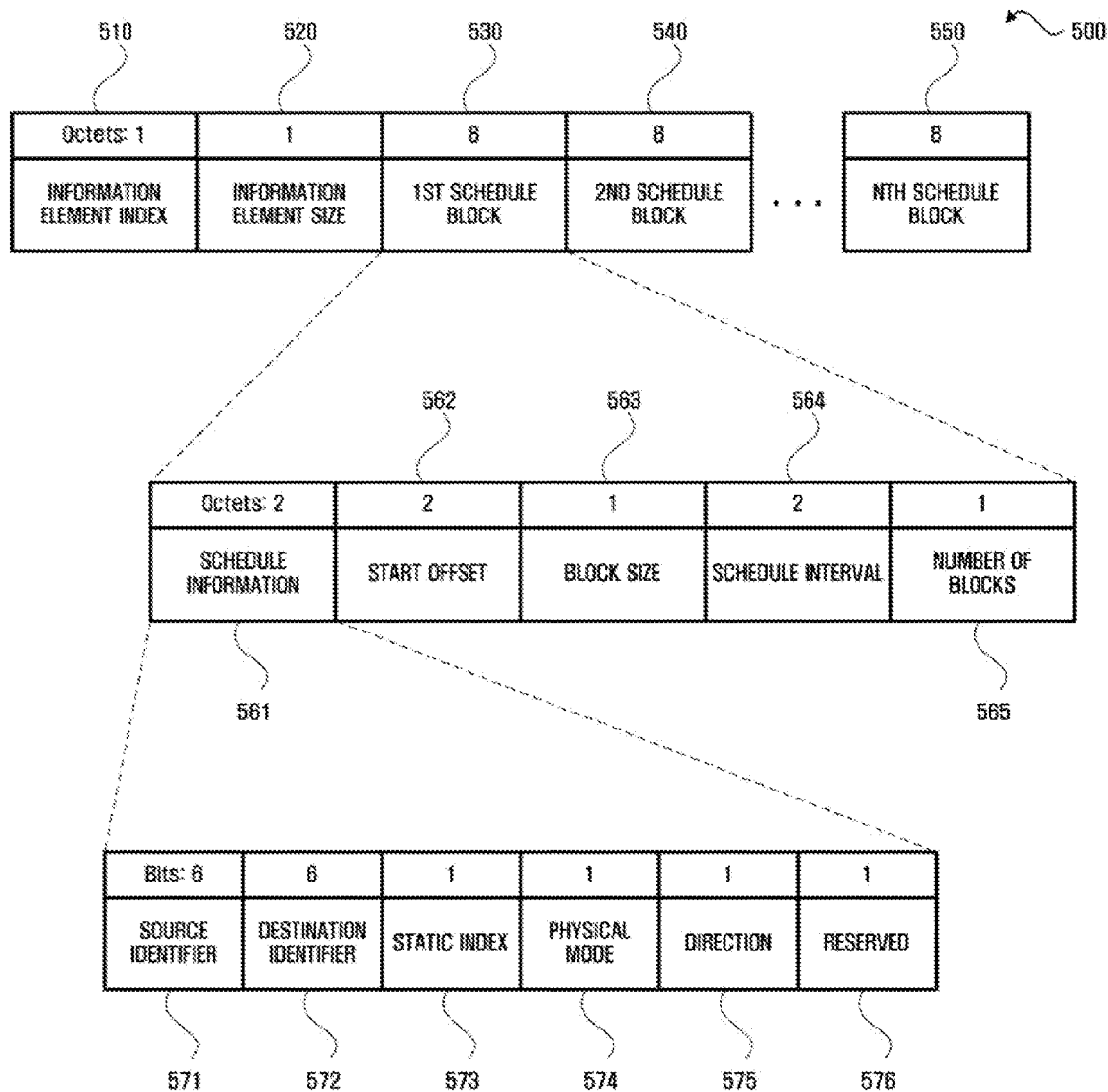
FIG. 5 illustrates a first information element according to an exemplary embodiment of the present invention.

FIG. 5 illustrates a first information element according to an exemplary embodiment of the present invention. Referring to FIG. 5, the first information element 500 includes an information-element-index field 510, an information-element-size field 520 and one or more schedule blocks 530, 540, and 550.

The information-element-index field 510 specifies an index indicating that a corresponding information element is the first information element 500. Stations determine that the corresponding information element is the first information element 500 or a second information element based on the index specified in the information-element-index field 510.

The information-element-size field 520 specifies a size of the first information element 500. The size of the first information element 500 may differ according to the number of the schedule blocks 530, 540, and 550.

The schedule block 530 specifies reservation information about reserved channel time blocks. The schedule block 530 includes a schedule-information field 561, a start-offset field 562, a block-size field 563, a schedule-interval field 564, and a block-number field 565.

The schedule-information field 561 specifies information about stations transmitting or receiving data. The schedule-information field 561 includes a source-identifier (ID) field 571, a destination-ID field 572, a static-index field 573, a physical mode field 574, a direction field 575, and a reserved field 576.

The source-ID field 571 specifies an identifier of a station transmitting data. The station having the identifier specified in the source-ID field 571 can transmit data in the corresponding reserved channel time block.

The destination-ID field 572 specifies an identifier of a station receiving data. The station having the identifier specified in the destination-ID field 572 can recognize that data distributed from the corresponding reserved channel time block is intended for it, and receive the same.

The static-index field 573 specifies an index indicating whether the corresponding schedule block is a static schedule or a dynamic schedule. For example, the static-index field 573 indicates a schedule of a channel time block at a certain time in a certain period within a superframe. If the static schedule is specified to the corresponding schedule block, the static-index field 573 may have a value of 1. If the dynamic schedule is specified to the corresponding schedule block, the static-index field 573 may have a value of 0.

The physical mode field 574 specifies a frequency mode for transmitting or receiving the data. The frequency mode may be classified as follows. First, data is transmitted or received suing a frequency of 60 GHz (to be referred to as a first frequency mode, hereinafter). Second, data is transmitted or received using a frequency of 2.4 GHz or 5 GHz (to be referred to as a second frequency mode, hereinafter). For example, if the first frequency mode is specified in the corresponding schedule block, the physical mode field 574 may have a value of 1. If the second frequency mode is specified in the corresponding schedule block, the physical mode field 574 may have a value of 0.

The direction field 575 specifies a direction of data transmission or reception. The direction can be classified into two types: a unidirectional direction and a radial direction according to the direction in which data is transmitted or received in the form of beams. For example, if data is unidirectionally transmitted or received in the form of beams, the direction field 575 may have a value of 1. If data is radially transmitted or received in the form of beams, the direction field 575 may have a value of 0.

The reserved field 576 is a field that is not used but kept in reserve.

Turning back to the schedule block 530, the start-offset field 562 specifies positions of the reserved channel time blocks in the superframe relative to the position of the beacon frame. The block-size field 563 specifies sizes of the reserved channel time blocks.

The schedule-interval field 564 specifies an interval between each of consecutive reserved channel time blocks. The block-number field 565 specifies the number of reserved channel time blocks contained in the superframe.

Figure 6:
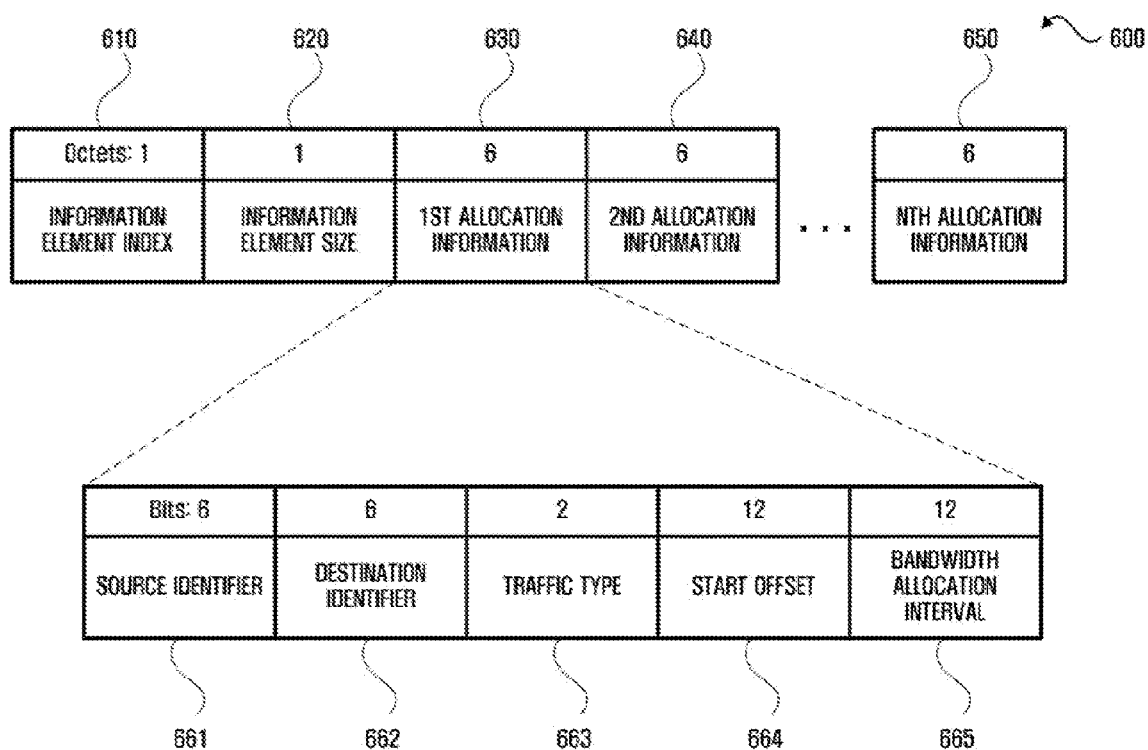
FIG. 6 illustrates a second information element according to an exemplary embodiment of the present invention.

FIG. 6 illustrates a second information element according to an exemplary embodiment of the present invention. Referring to FIG. 6, the second information element 600 includes an information-element-index field 610, an information-element-size field 620, and one or more allocation information fields 630, 640, and 650.

The information-element-index field 610 specifies an index indicating that a corresponding information element is the second information element 600. Stations determine that the corresponding information element is the first information element 500 or the second information element 600 based on the index specified in the information-element-index field 610.

The information-element-size field 620 specifies a size of the second information element 600. The size of the second information element 600 may differ according to the number of the schedule blocks 630, 640, and 650.

The allocation information 630 specifies reservation information about unreserved channel time blocks. The allocation information 630 includes a source-ID field 661, a destination-ID field 662, a traffic-type field 663, a start-offset field 664, and a bandwidth-allocation-interval field 665.

The source-ID field 661 specifies an identifier of a station transmitting a bandwidth-use-request packet. As described above, the bandwidth-use-request packet includes a bandwidth-allocation-request packet and a participation-request packet. The station having the identifier specified in the source-ID field 661 can transmit the bandwidth-use-request packet in the corresponding unreserved channel time block. Not only a station identifier but also a broadcast ID or an identifier of a wireless network coordinator 700 may also be input to the source-ID field 661. In the case where the broadcast ID is input to the source-ID field 661, stations on the network can transmit the bandwidth-use-request packet through contention.

The destination-ID field 662 specifies an identifier of a station receiving the bandwidth-use-request packet. The station having the identifier specified in the destination-ID field 662 can recognize that the packet distributed from the corresponding unreserved channel time block is intended for it, and receive the same. Not only a station identifier but also a broadcast ID or an identifier of a wireless network coordinator 700 may also be input to the destination-ID field 662.

The traffic-type field 663 specifies a flag indicating a kind of a packet allowed for transmission or reception in the unreserved channel time block. Here, the flag includes a first flag allowing the bandwidth-allocation-request packet and a bandwidth-allocation-acknowledge packet to be transmitted or received, a second flag allowing the participation-request packet and a participation-acknowledge packet to be transmitted or received, and a third flag allowing all packets, including the packets which are designated by specifying the first and second flags, to be transmitted or received. The station may perform or hold packet transmission based on the flag contained in the traffic-type field 663.

The start-offset field 664 specifies positions of unreserved channel time blocks in the superframe relative to the position of the beacon frame. The bandwidth-allocation-interval field 665 specifies the time between the start of two consecutive channel time blocks.

Figure 7:
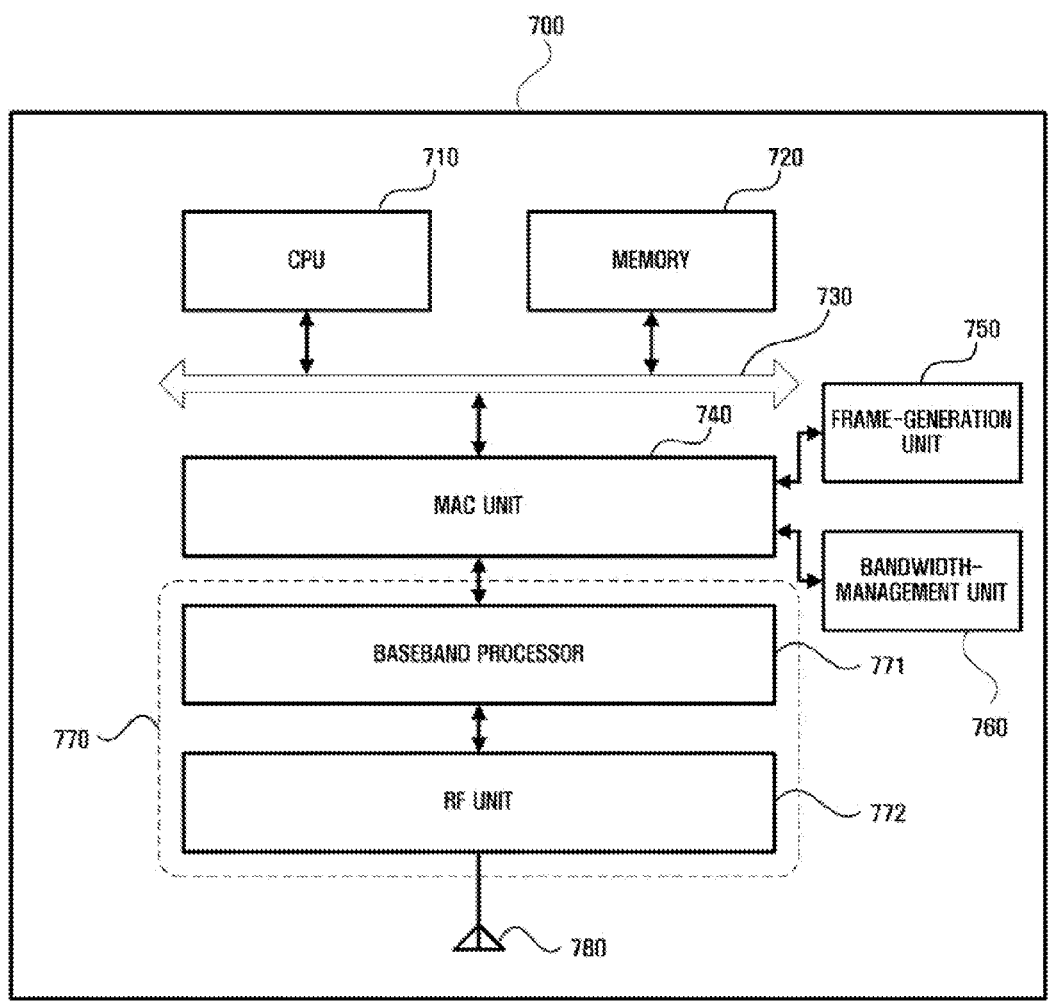
FIG. 7 illustrates a wireless network coordinator according to an exemplary embodiment of the present invention.

FIG. 7 illustrates a wireless network coordinator according to an exemplary embodiment of the present invention. Referring to FIG. 7, the wireless network coordinator 700 includes a CPU 710, a memory 720, an MAC unit 740, a frame-generation unit 750, a bandwidth-management unit 760, and a communication unit 770.

The CPU 710 controls the operation of other modules connected to the bus 730, and is responsible for the operation of the upper layer 310 shown in FIG. 3. Accordingly, the CPU 710 processes data received from the MAC unit 740, called a reception MAC Service Data Unit (MSDU), or generates data to be transmitted to the MAC unit 840, called a transmission MSDU, and provides the transmission MSDU to the MAC unit 740.

The memory 720 stores the data. The memory 720, which is a module capable of inputting and outputting data, such as a hard disk, an optical disk, a flash memory, a Compact Flash (CF) card, a Secure Digital (SD) card, a Smart Media Card, a Multimedia Card (MMC), or a memory stick, may be embedded in the station 700 or may be provided in a separate device.

The frame-generation unit 750 generates a beacon frame for constructing superframes each including one or more channel time blocks. The bandwidth-management unit 760 may set reserved channel time blocks in the one or more channel time blocks as periods for bandwidth allocation for a particular station on the network, and may set unreserved channel time blocks as periods for transmission or reception of bandwidth-use-request packets on the network. To this end, the bandwidth-management unit 760 may insert the first information element 500 and the second information element 600 into the beacon frame. Since the first information element 500 and the second information element 600 are substantially the same as described above with reference to FIGS. 5 and 6, detailed explanations thereof have been omitted.

While the frame-generation unit 750 has been shown and described in FIG. 7 that it is provided outside the MAC unit 740, the present invention may also be applied to a case where the frame-generation unit 750 is provided inside the MAC unit 740.

The communication unit 770 converts the beacon frame generated by the frame-generation unit 750 into an RF signal, and transmits the RF signal to stations existing on the network through a predetermined communication channel. To this end, the communication unit 770 includes a baseband processor 771 and an RF unit 772, and is connected to an antenna 780. The antenna 780 may transmit or receive directional RF signals in a high-frequency.

The communication unit 770 may set a frequency of the communication channel formed by the RF unit 772 to a low-frequency, such as 2.4 GHz or 5 GHz, or to a high-frequency, such as 60 GHz, based on the physical mode field 574 of the first information element 500. In addition, the communication unit 770 may determine a direction of the antenna 780 based on the direction field 575.

A bandwidth allocation packet includes at least one of a packet requesting bandwidth allocation (referred to as a "bandwidth-allocation-request packet") and a packet acknowledging the participation in the network (referred to as a "bandwidth-allocation-acknowledge request"). That is, a station existing on the network transmits the bandwidth-allocation-request packet to a wireless network coordinator in an unreserved channel time block, and the wireless network coordinator transmits the bandwidth-allocation-acknowledge packet in response thereto.

In addition, a participation packet includes at least one of a packet requesting participation in the network (to be simply referred to a participation-request packet), and a packet acknowledging the participation in the network (to be simply referred to a participation-acknowledge packet). That is, a station existing on the network transmits the participation-request packet to the wireless network coordinator in an unreserved channel time block and the wireless network coordinator transmits the participation-acknowledge packet in response thereto.

In the unreserved channel time block, in order to transmit or receive a bandwidth allocation packet or a participation packet, stations contend with each other. Here, the contention can be made through the Carrier Sense Multiple Access/Collision Avoidance (CSMA/CA) mechanism or the slotted Aloha mechanism.

A station that has received the bandwidth-allocation-acknowledge packet can transmit data through the allocated bandwidth. Here, both compressed data and uncompressed data can be transmitted.

The bandwidth-management unit 760 sets the source identifier 661 of the second information element as a broadcast to allow all stations existing on the network to participate in contention in unreserved channel time blocks, and sets the source identifier 661 to transmit the request packet only to a particular station.

Figure 8:
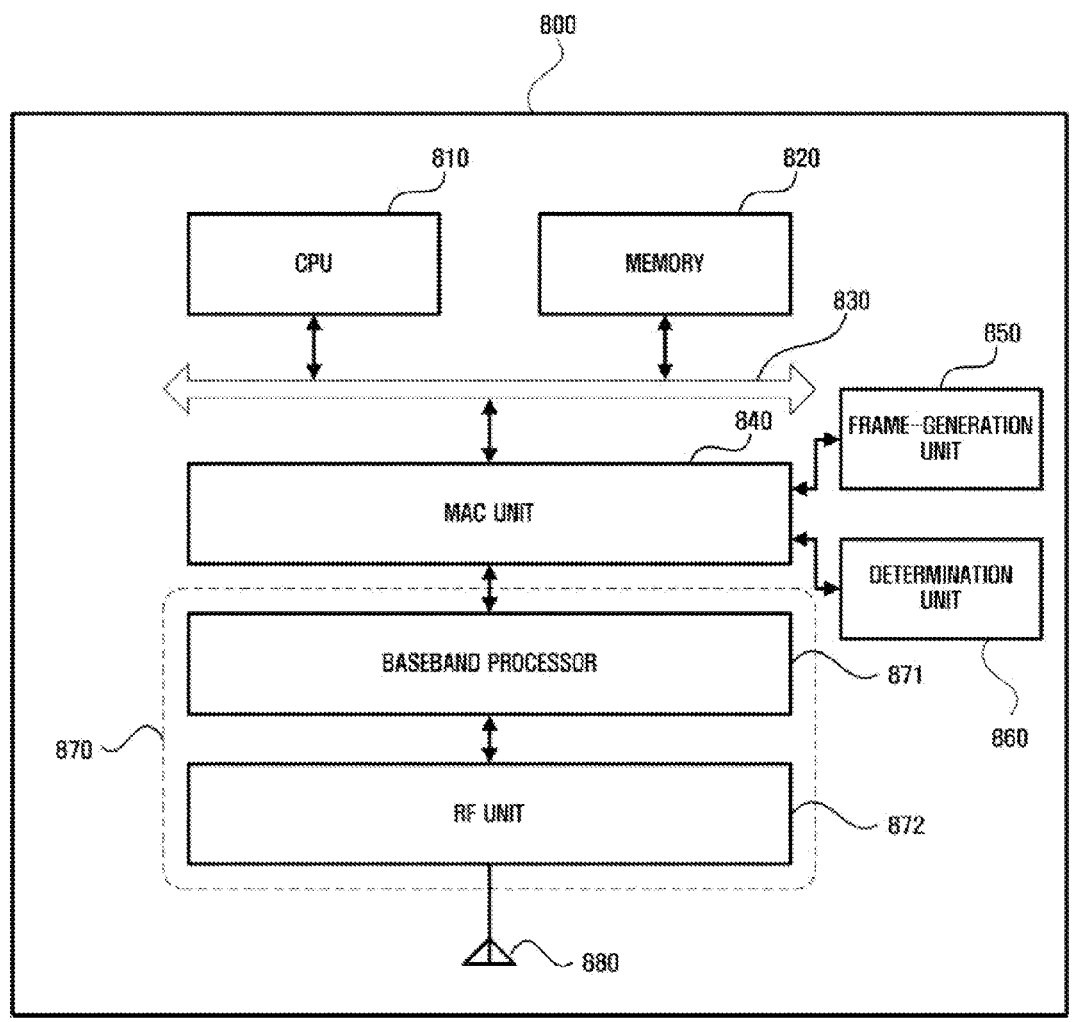
FIG. 8 is a block diagram illustrating a wireless network station.

FIG. 8 is a block diagram illustrating a wireless network station. Referring to FIG. 8, the station 800 includes a CPU 810, a memory 820, an MAC unit 840, a frame-generation unit 850, a determination unit 860, and a communication unit 870.

The CPU 810 controls the operation of other modules connected to the bus 830, and is responsible for the operation of the upper layer 310 shown in FIG. 3. Accordingly, the CPU 810 processes data received from the MAC unit 840, called a reception MSDU, or generates data to be transmitted to the MAC unit 840, called a transmission MSDU, to then provide the transmission MSDU to the MAC unit 840.

The memory 820 stores the data. The memory 80, which is a module capable of inputting and outputting data, such as a hard disk, an optical disk, a flash memory, a CF card (Compact Flash Card), a SD card (Secure Digital Card), a Smart Media Card, a MMC (Multimedia Card), or a memory stick, may be embedded in the station 700 or may be provided in a separate device.

The frame-generation unit 850 inserts an MAC header into the data received from CPU 810, i.e., MSDU, to generate a MPDU (MAC Protocol Data Unit).

The communication unit 870 converts the MPDU generated by the frame-generation unit 850 into an RF signal, and transmits the RF signal to stations existing on the network through a predetermined communication channel. To this end, the communication unit 870 includes a baseband processor 871 and an RF unit 872, and is connected to an antenna 880. The antenna 880 may transmit or receive directional RF signals using a high frequency.

The baseband processor 871 receives the MPDU generated from the frame-generation unit 850, inserts a signal field and a preamble thereto and generates a PPDU. Then, the RF unit 872 converts the generated PPDU into an RF signal, and transmits the RF signal to stations existing on the network through the antenna 880.

The station 800 is given bandwidth allocation from reserved channel time blocks contained in the superframe for data transmission, or participates in contention with other stations in unreserved channel time blocks for packet transmission for bandwidth use.

To this end, the communication unit 870 may receive the beacon frame sent from the wireless network coordinator. The received beacon frame is delivered to the determination unit 860.

The determination unit 860 determines availability of bandwidth allocation on the network based on the beacon frame included in superframe, and determines whether it is possible to transmit or receive a bandwidth-use-request packet according to the determination result. Here, the determination unit 860 determines the availability of bandwidth allocation for reserved channel time blocks corresponding to bandwidth-allocated time periods in the superframe, based on the first information element 500 contained in the beacon frame. In addition, the determination unit 860 determines whether it is possible to transmit or receive the bandwidth-use-request packet based on the second information element 600.

If it is determined that bandwidths are allocated to the reserved channel time blocks, the determination unit 860 delivers the determination result to the MAC unit 840, to generate the data request packet for data to be transmitted in the corresponding reserved channel time block. In contrast, if it is determined that bandwidths are not allocated and there is data to be transmitted, or if there is a request for participation in the network, the determination unit 860 determines whether there is a right to transmit a bandwidth-allocation-request packet or a participation-request packet based on the source-ID field 661 and the traffic-type field 663 of the second information element 600.

According to the determination result of the determination unit 860, the frame-generation unit 850 generates a data request packet or a bandwidth-use-request packet, and the communication unit 870 transmits a data request packet or a bandwidth-use-request packet through a predetermined communication channel. After receiving the request packets, the wireless network coordinator 700 transmits a bandwidth-allocation-acknowledge packet or a participation-acknowledge packet in response thereto.

Meanwhile, a plurality of stations may exist on the network. The respective stations transmit the bandwidth-allocation-request packet or the participation-request packet in unreserved channel time block through contention. Here, accessing a medium can be accomplished by using the CSMA/CA mechanism or the slotted Aloha mechanism.

When the bandwidth-allocation-acknowledge packet is received, the frame-generation unit 850 of the station 800 generates a data request packet, and the generated data is transmitted in a reserved channel time block allocated to the bandwidth-allocation-acknowledge packet through the communication unit 870.

While the frame-generation unit 850 has been shown and described in FIG. 8 as being provided outside the MAC unit 840, the present invention may also be applied to a case where the frame-generation unit 850 is provided inside the MAC unit 840.

The communication unit 870 converts the packet for the data generated by the frame-generation unit 850 or the request packet into an RF signal unit 850, and transmits the RF signal to stations existing on the network through a predetermined communication channel. To this end, the communication unit 870 includes a baseband processor 871 and an RF unit 872, and is connected to an antenna 880. The antenna 880 may transmit or receive directional RF signals in a high-frequency. The communication unit 870 may set a frequency of the communication channel formed by the RF unit 872 to a low frequency, such as 2.4 GHz or 5 GHz, or to a high frequency, such as 60 GHz, based on the physical mode field 574 of the first information element 500. In addition, the communication unit 870 may determine a direction of the antenna 880 based on the direction field 575.

Figure 9:
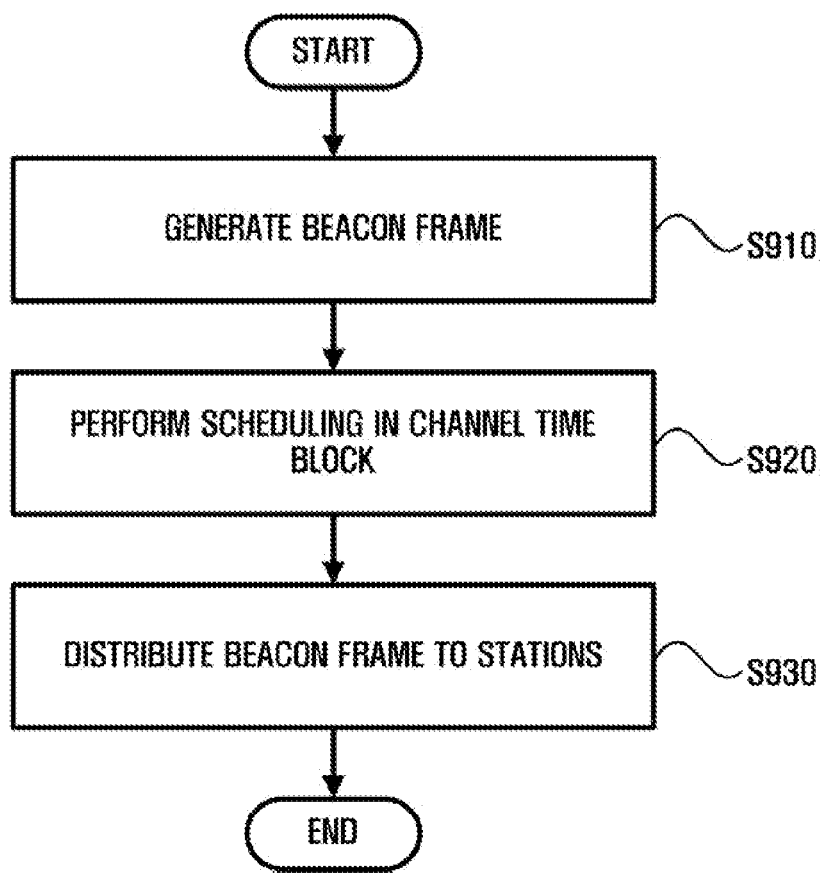
FIG. 9 is a flowchart illustrating the operation of a wireless network coordinator according to an exemplary embodiment of the present invention.

FIG. 9 is a flowchart illustrating the operation of a wireless network coordinator according to an exemplary embodiment of the present invention.

In order to set reservations of reserved channel time blocks and unreserved channel time blocks, the frame-generation unit 750 of the wireless network coordinator 700 generates a beacon frame for constructing superframes S910.

Next, the bandwidth-management unit 760 performs scheduling on the at least one time block in operation S920. To this end, the bandwidth-management unit 760 may set the reserved channel time blocks in the reserved channel time blocks among the channel time blocks as periods for bandwidth allocation for a particular station on the network, and may set the unreserved channel time blocks as periods for transmission or reception of a bandwidth-use-request packet.

Here, the bandwidth-use-request packet may contain a bandwidth-allocation-request packet, a bandwidth-allocation-acknowledge packet, a participation-request packet, and a participation-acknowledge packet. The bandwidth-management unit 760 may insert the first information element 500 for reservation of the reserved channel time blocks and the second information element 600 for reservation of the unreserved channel time blocks into the beacon frame. Since the first information element 500 and the second information element 600 are substantially the same as described above with reference to FIGS. 5 and 6, detailed explanations thereof will not be given.

The beacon frame containing the first information element 500 and the second information element 600 is distributed to the stations on the network through communication unit 770 in the beacon period 110 in operation S930. Here, the communication unit 770 may transmit the beacon frame through the communication channel having a frequency of 2.4 GHz or 5 GHz.

As the first information element 500 and the second information element 600 are distributed, the stations on the network can transmit or receive data in the reserved channel time blocks or can transmit or receive a bandwidth-use-request packet in the unreserved channel time blocks through contention.

Figure 10:
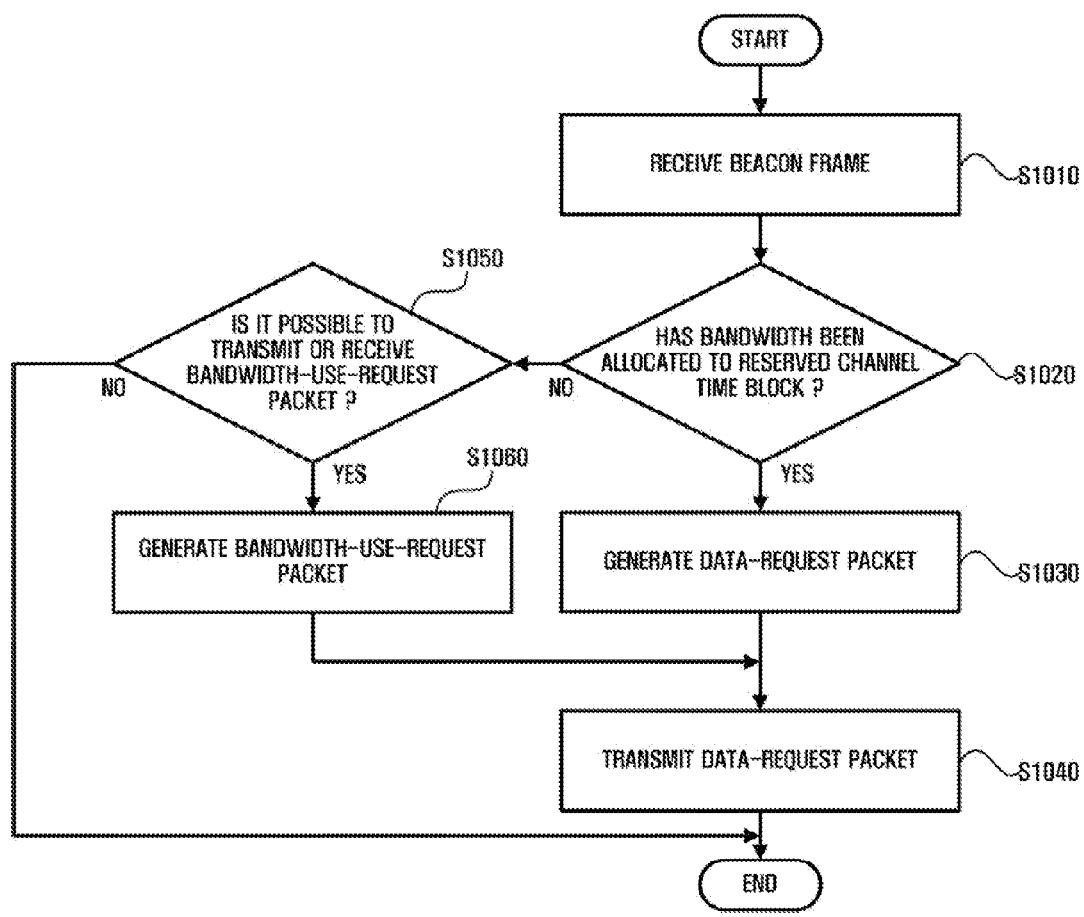
FIG. 10 is a flowchart illustrating the procedure of transmitting and receiving data in a wireless network station according to an exemplary embodiment of the present invention.

FIG. 10 is a flowchart illustrating the procedure of transmitting/receiving data in a wireless network station according to an exemplary embodiment of the present invention.

In order to determine whether it is possible to transmit or receive a data request packet or a bandwidth-use-request packet on the network based on the beacon frame distributed by the wireless network coordinator 700, the communication unit 870 receives the beacon frame distributed to the network in operation S1010.

The determination unit 860 determines whether bandwidth allocation has been made on the network based on the first information element 500 contained in the beacon frame included in the superframe in operation S1020. If it is determined that bandwidths are allocated, the determination result is delivered to the MAC unit 840, and the frame-generation unit 850 generates the data request packet in operation S1030 in accordance with a control command of the MAC unit 840.

In contrast, if it is determined that bandwidth allocation for reserved channel time blocks is not allowed, the determination unit 860 determines whether it is possible to transmit or receive the bandwidth-use-request packet in unreserved channel time blocks, based on the second information element 600 contained in the beacon frame in operation S1050. If it is determined that it is possible the bandwidth-use-request packet can be transmitted or received in unreserved channel time blocks, the frame-generation unit 850 generates the request packet in operation S1060. Here, the request packet may include a bandwidth-allocation-request packet, a participation-request packet, and so on.

The generated packet may be transmitted through the communication unit 870 in operation S1040. Here, the communication unit 870 may transmit the data request packet through a communication channel having a frequency of about 60 GHz, while transmitting the request packet through a communication channel having a frequency of about 2.4 GHz or 5 GHz.

In the above-described exemplary embodiment of the present invention, while it has been described and shown that operation S1050 of determining whether it is possible to transmit or receive the bandwidth-use-request packet is performed after operation S1020, the invention is not limited to the disclosed exemplary embodiment. In an alternative exemplary embodiment of the present invention, the determination operation (S1050) may be performed without performing operation S1020.

As described above, according to the exemplary embodiments of the present invention, time periods for a bandwidth allocation request and a bandwidth-allocation-acknowledge packet are separately set within a superframe and data is transmitted or received in allocated bandwidths, thereby effectively transmitting or receiving the data through an improved contention mechanism.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A wireless network coordinator comprising:
    a frame-generation unit which generates a beacon frame for constructing a superframe including a plurality of channel time blocks;
    a bandwidth-management unit which sets among the plurality of channel time blocks first channel time blocks as a bandwidth allocated period for a particular station on a network and second channel time blocks as packet transmission or reception periods for a bandwidth-use-request packet on the network; and
    a communication unit which transmits the beacon frame including reservation information for setting the first and second channel time blocks through a communication channel,
    wherein the reservation information for setting the second channel time blocks indicates a type of packet allowed for transmission or reception in the second channel time blocks.

2. The wireless network coordinator of claim 1, wherein the plurality of channel time blocks are time periods during which data is transmitted or received between stations existing on the network.

3. The wireless network coordinator of claim 1, wherein the second channel time blocks are time periods during which contention-based packet transmission or reception is allowed by one station selected through contention among stations existing on the network.

4. The wireless network coordinator of claim 1, wherein the bandwidth-use-request packet includes at least one of a packet requesting the bandwidth allocation, a packet acknowledging the bandwidth allocation, a packet requesting participation in the network, and a packet acknowledging the participation in the network.

5. The wireless network coordinator of claim 4, wherein among one or more stations existing on the network, the particular station that has received the packet acknowledging the bandwidth allocation is allowed to transmit predetermined data in the first channel time blocks.

6. The wireless network coordinator of claim 5, wherein the data contains uncompressed data.

7. The wireless network coordinator of claim 1, wherein the bandwidth-management unit sets the first channel time blocks by inserting a first information element for reservation of the first channel time blocks into the beacon frame and sets the second channel time blocks by inserting a second information element for reservation of the second channel time blocks into the beacon frame.

8. The wireless network coordinator of claim 7, wherein the first information element comprises:
    an information-element-index field specifying an index indicating that a corresponding information element is a first information element;
    an information-element-size field specifying a size of the first information element; and one or more schedule block fields specifying reservation information for the first channel time blocks contained in the superframe.

9. The wireless network coordinator of claim 8, wherein the reservation information comprises:
   a schedule-information field specifying information about stations transmitting and receiving data;
   a start-offset field specifying a position of each of the first channel time blocks in the superframe relative to a position of the beacon frame;
   a block-size field specifying a size of each of the first channel time blocks;
   a schedule-interval field specifying an interval between the first channel time blocks; and
   a block-number field specifying a number of blocks contained in the superframe.

10. The wireless network coordinator of claim 9, wherein the schedule-information field comprises:
    a source-identifier (ID) field specifying an ID of a station transmitting data;
    a destination-ID field specifying an ID of a station receiving data;
    a static-index field specifying an index indicating that a corresponding schedule block is for a static schedule;
    a physical mode field specifying a frequency mode for transmitting or receiving the data; and
    a direction field specifying a direction of data transmission or reception.

11. The wireless network coordinator of claim 7, wherein the second information element comprises:
    an information-element-index field specifying an index indicating that a corresponding information element is a second information element;
    an information-element-size field specifying a size of the second information element; and
    one or more allocation information fields specifying reservation information about the second channel time blocks contained in the superframe.

12. The wireless network coordinator of claim 11, wherein the reservation information comprises:
    a source-identifier (ID) field specifying an ID of a station transmitting data;
    a destination-ID field specifying an ID of a station receiving data;
    the source-ID field further specifying an ID of a station transmitting the packet;
    the destination-ID field further specifying an ID of a station receiving the packet;
    a traffic-type field specifying a flag indicating a type of the packet allowed for transmission or reception in the second channel time blocks;
    a start-offset field specifying a position of each of the second channel time blocks in the superframe relative to a position of the beacon frame; and
    a bandwidth-allocation-interval field specifying the time between a start of two consecutive second channel time blocks.

13. The wireless network coordinator of claim 12, wherein the flag comprises:
    a first flag allowing a bandwidth-allocation-request packet and a bandwidth-allocation-acknowledge packet to be transmitted or received;
    a second flag allowing a participation-request packet and a participation-acknowledge packet to be transmitted or received; and
    a third flag allowing all packets, including packets which are designated by specifying the first and second flags, to be transmitted or received.

14. A station comprising:
    a determination unit which determines, using a beacon frame received in a superframe, whether bandwidth allocation has been made on a network and whether it is possible to transmit or receive a bandwidth-use-request packet;
    a frame-generation unit which generates a data request packet for data to be transmitted if it is determined that the bandwidth allocation has been made on the network, and generates the bandwidth-use-request packet if it is determined that the bandwidth-use-request packet can be transmitted or received; and
    a communication unit which transmits the data request packet for data to be transmitted or the bandwidth-use-request packet through a communication channel.

15. The station of claim 14, wherein the communication unit transmits the packet for the data in a reserved channel time block that is a bandwidth allocated time period, and transmits the bandwidth-use-request packet in an unreserved channel time block that is a time period acquired through contention in a period of the superframe.

16. The station of claim 14, wherein the determination unit determines bandwidth allocation of the reserved channel time block that is a bandwidth allocated time period in a period of the superframe based on a first information element contained in the beacon frame, and determines whether it is possible to transmit or receive the bandwidth-use-request packet based on a second information element.

17. The station of claim 16, wherein the first information element comprises:
    an information-element-index field specifying an index indicating that a corresponding information element is a first information element;
    an information-element-size field specifying a size of the first information element; and
    one or more schedule block fields specifying reservation information for first channel time blocks contained in the superframe.

18. The station of claim 17, wherein the reservation information comprises:
    a schedule-information field specifying information about stations transmitting and receiving data;
    a start-offset field specifying a position of each of the first channel time blocks in the superframe relative to a position of the beacon frame;
    a block-size field specifying a size of each of the first channel time blocks;
    a schedule-interval field specifying an interval between each of the first channel time blocks; and
    a block-number field specifying the number of blocks contained in the superframe.

19. The station of claim 18, wherein the schedule-information field comprises:
    a source-identifier (ID) field specifying an ID of a station transmitting data;
    a destination-ID field specifying an ID of a station receiving data;
    a static-index field specifying an index indicating that a corresponding schedule block is for a static schedule;
    a physical mode field specifying a frequency mode for transmitting or receiving the data; and
    a direction field specifying the direction of data transmission or reception.

20. The station of claim 16, wherein the second information element comprises:
an information-element-index field specifying an index indicating that a corresponding information element is a second information element;
an information-element-size field specifying the size of the second information element; and
one or more allocation information fields specifying reservation information about second channel time blocks contained in the superframe.

21. The station of claim 20, wherein the reservation information comprises:
a source-identifier (ID) field specifying an ID of a station transmitting data;
a destination-ID field specifying an ID of a station receiving data;
the source-ID field further specifying an ID of a station transmitting the packet;
the destination-ID field further specifying an ID of a station receiving the packet;
a traffic-type field specifying a flag indicating a type of the packet allowed for transmission or reception in the second channel time blocks;
a start-offset field specifying a position of each of the second channel time blocks in the superframe relative to the position of the beacon frame; and
a bandwidth-allocation-interval field specifying the time between a start of two consecutive second channel time blocks.

22. The station of claim 21, wherein the flag comprises:
a first flag allowing a bandwidth-allocation-request packet and a bandwidth-allocation-acknowledge packet to be transmitted or received;
a second flag allowing a participation-request packet and a participation-acknowledge packet to be transmitted or received; and
a third flag allowing all packets, including packets which are designated by specifying the first and second flags, to be transmitted or received.

23. A method of constructing a wireless network, the method comprising:
generating a beacon frame for constructing a superframe including a plurality of channel time blocks;
setting among the plurality of channel time blocks first channel time blocks as bandwidth allocated periods for a particular station on a network and second channel time blocks as packet transmission or reception periods for a bandwidth-use-request packet on the network; and
transmitting the beacon frame including reservation information for setting the first and second channel time blocks through a communication channel,
wherein the reservation information for setting the second channel time blocks indicates a type of packet allowed for transmission or reception in the second channel time blocks.

24. The method of claim 23, wherein the plurality of channel time blocks are time periods during which data is transmitted or received between stations existing on the network.

25. The method of claim 23, wherein the second channel time blocks are time periods during which contention-based packet transmission or reception is allowed by one selected among stations existing on the network through contention.

26. The method of claim 23, wherein the bandwidth-use-request packet includes at least one of a packet requesting the bandwidth allocation, a packet acknowledging the bandwidth allocation, a packet requesting participation in the network, and a packet acknowledging the participation in the network.

27. The method of claim 26, wherein among one or more stations existing on the network, the particular station that has received the packet acknowledging the bandwidth allocation is allowed to transmit predetermined data in the first channel time blocks.

28. The method of claim 27, wherein the data contains uncompressed data.

29. The method of claim 23, wherein the setting comprises inserting a first information element for reservation of the first channel time blocks into the beacon frame and a second information element for reservation of the second channel time blocks.

30. The method of claim 29, wherein the first information element comprises:
an information-element-index field specifying an index indicating that a corresponding information element is a first information element;
an information-element-size field specifying a size of the first information element; and
one or more schedule block fields specifying reservation information for the first channel time blocks contained in the superframe.

31. The method of claim 30, wherein the reservation information comprises:
a schedule-information field specifying information about stations transmitting and receiving data;
a start-offset field specifying a position of each of the first channel time blocks in the superframe relative to a position of the beacon frame;
a block-size field specifying a size of each of the first channel time blocks;
a schedule-interval field specifying an interval between each of the first channel time blocks; and
a block-number field specifying a number of blocks contained in the superframe.

32. The method of claim 31, wherein the schedule-information field comprises:
a source-identifier (ID) field specifying an ID of a station transmitting data;
a destination-ID field specifying an ID of a station receiving data;
a static reserved field specifying a reserved field indicating that a corresponding schedule block is for a static schedule;
a physical mode field specifying a frequency mode for transmitting or receiving the data; and
a direction field specifying the direction of data transmission or reception.

33. The method of claim 29, wherein the second information element comprises:
an information-element-reserved field specifying a reserved field indicating that a corresponding information element is a second information element;
an information-element-size field specifying a size of the second information element; and
one or more allocation information fields specifying reservation information about the second channel time blocks contained in the superframe.

34. The method of claim 33, wherein the reservation information comprises:
a source-identifier (ID) field specifying an ID of a station transmitting data;
a destination-ID field specifying an ID of a station receiving data;
the source-ID field further specifying an ID of a station transmitting the packet;

the destination-ID field further specifying an ID of a station receiving the packet;
a traffic-type field specifying a flag indicating a type of the packet allowed for transmission or reception in the second channel time blocks;
a start-offset field specifying a position of each of the second channel time blocks in the superframe relative to a position of the beacon frame; and
a bandwidth-allocation-interval field specifying the time between a start of two consecutive second channel time blocks.

35. The method of claim 34, wherein the flag comprises:
a first flag allowing a bandwidth-allocation-request packet and a bandwidth-allocation-acknowledge packet to be transmitted or received;
a second flag allowing a participation-request packet and a participation-acknowledge packet to be transmitted or received; and
a third flag allowing all packets, including packets which are designated by specifying the first and second flags, to be transmitted or received.

36. A method of transmitting and receiving data, the method comprising:
determining, based on a beacon frame received in a superframe, whether bandwidth allocation has been made on a network and whether it is possible to transmit or receive a bandwidth-use-request packet;
generating a data request data request packet for data to be transmitted if it is determined that bandwidth allocation has been made on the network and generating a bandwidth-use-request packet if it is determined that the bandwidth-use-request packet can be transmitted or received; and
transmitting the data request packet for data to be transmitted or the bandwidth-use-request packet through a communication channel.

37. The method of claim 36, wherein the transmitting comprises transmitting the packet for the data in a reserved channel time block that is a bandwidth allocated time period and transmitting the bandwidth-use-request packet in an unreserved channel time block that is a time period acquired through contention in the superframe period.

38. The method of claim 36, wherein the determining comprises determining whether bandwidth allocation has been made on the reserved channel time block that is a bandwidth allocated time period in the superframe period based on a first information element contained in the beacon frame, and determining whether it is possible to transmit or receive the bandwidth-use-request packet based on a second information element.

39. The method of claim 38, wherein the first information element comprises:
an information-element-reserved field specifying an index indicating that a corresponding information element is a first information element;
an information-element-size field specifying a size of the first information element; and
one or more schedule block fields specifying reservation information for the first channel time blocks contained in the superframe.

40. The method of claim 39, wherein the reservation information comprises:
a schedule-information field specifying information about stations transmitting and receiving data;
a start-offset field specifying a position of the first channel time blocks in the superframe relative to a position of the beacon frame;
a block-size field specifying a size of each of the first channel time blocks;
a schedule-interval field specifying an interval between each of the first channel time blocks; and
a block-number field specifying a number of blocks contained in the superframe.

41. The method of claim 40, wherein the schedule-information field comprises:
a source-identifier (ID) field specifying an ID of a station transmitting data;
a destination-ID field specifying an ID of a station receiving data;
a static-index field specifying an index indicating that a corresponding schedule block is for a static schedule;
a physical mode field specifying a frequency mode for transmitting or receiving the data; and
a direction field specifying a direction of data transmission or reception.

42. The method of claim 38, wherein the second information element comprises:
an information-element-index field specifying an index indicating that a corresponding information element is a second information element;
an information-element-size field specifying a size of the second information element; and
one or more allocation information fields specifying reservation information about the second channel time blocks contained in the superframe.

43. The method of claim 42, wherein the reservation information comprises:
a source-identifier (ID) field specifying an ID of a station transmitting data;
a destination-ID field specifying an ID of a station receiving data;
the source-ID field further specifying an ID of a station transmitting the packet;
the destination-ID field further specifying an ID of a station receiving the packet;
a traffic-type field specifying a flag indicating a type of the packet allowed for transmission or reception in each of the second channel time blocks;
a start-offset field specifying a position of the each of the second channel time blocks in the superframe relative to a position of the beacon frame; and
a band allocation interval field specifying the time between a start of two consecutive second channel time blocks.

44. The method of claim 43, wherein the flag comprises:
a first flag allowing a bandwidth-allocation-request packet and a bandwidth-allocation-acknowledge packet to be transmitted or received;
a second flag allowing a participation-request packet and a participation-acknowledge packet to be transmitted or received; and
a third flag allowing all packets, including packets which are designated by specifying the first and second flags, to be transmitted or received.

* * * * *